March 4, 1924.

F. P. KINTZELE

SAFETY CATCH FOR PINS

Filed March 19, 1923

1,485,933

Inventor:
Felix P. Kintzele,
By Rippey & Kingsland,
His Attorneys.

Patented Mar. 4, 1924.

1,485,933

UNITED STATES PATENT OFFICE.

FELIX P. KINTZELE, OF ST. LOUIS, MISSOURI.

SAFETY CATCH FOR PINS.

Application filed March 19, 1923. Serial No. 625,979.

*To all whom it may concern:*

Be it known that I, Felix P. Kintzele, a citizen of the United States, residing at the city of St. Louis and State of Missouri, have invented a new and useful Safety Catch for Pins, of which the following is a specification.

This invention relates to safety catches for pins.

An object of the invention is to provide an adjunct to the present known catches on bar pins and the like that will function as a safety catch per se and, in addition, will hold the pin close to the cloth to which it is attached and, moreover, will tend to prevent the present catch at the end of the pin from becoming disconnected.

Another object of the invention is to provide a safety catch for use on bar pins that may be attached to the pins without defacing them or detracting from their ornamental appearance and which serves to engage the pin between the usual pivot and the usual catch in a way to function as a safety catch and hold the pin close to the cloth.

In the drawings Fig. 1 is a side elevation of a conventional pin having my invention in connection therewith.

Figure 1:
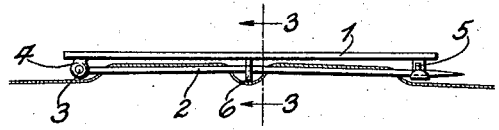
Figure 2:
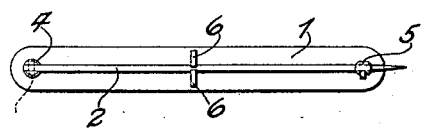
Fig. 2 is an elevation showing the side of the bar to which the pin is pivoted and showing the pin in engagement with the safety catch.

In the invention as shown in Figs. 1 to 4 inclusive the bar 1 is of conventional construction and has the usual pin 2 pivotally connected thereto near one end. The pin 2 is upon a pivot 3 mounted in a projection 4 that is rigid with the bar 1 so that the pin is slightly spaced from the bar in a familiar manner. The free end of the pin is pointed as usual, so that it will readily penetrate the cloth to which the pin is to be secured. The bar near the end opposite from the end to which the pin is pivoted has a catch 5 of the usual or any suitable construction adapted to be engaged by the pin 2 after the pin has passed through the cloth.

Figure 3:
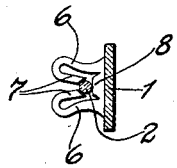
Fig. 3 is an enlarged sectional view on the line 3—3 of Fig. 1 showing one form of safety catch.

As stated the present invention is an adjunct to the above described familiar construction and consists of a safety catch attached to the bar approximately midway between the pivot 3 and the catch 5 and is designed and adapted to engage the pin 2 approximately midway of its length to serve as a catch per se to prevent the bar pin from falling off and to hold the pin close to the cloth, and it also places the pin under stress whereby likelihood of the pin becoming released from the catch 5 is considerably reduced. One appropriate form of the catch is shown in Fig. 3 wherein the catch comprises a pair of arms 6 having their ends 7 curved backwardly toward the bar and converging as they approach the bar, leaving a space between them that is relatively wide at its outer portion and that tapers to a width less than the diameter of the pin 2 at the inner ends of the extremities 7. The inner ends of the extremities 7 are beveled away from each other to form a seat for the pin 2 when the pin is forced between the ends 7 to said seat. In this adjustment the pin 2 is under stress, being curved more or less toward the bar 1 between the pivot 3 and the catch 5. In this position the pin 2 is held against an abutment 8 so that said pin is firmly positioned.

Figure 4:
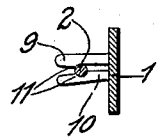
Fig. 4 is a similar sectional view showing another form of safety catch.

In the variation shown in Fig. 4 the catch comprises a post 9 and a spring member 10 attached to the bar 1 in spaced relationship so that the pin 2 may be forced between them where it will be retained by shoulders 11 on the post and the spring.

Figure 5:
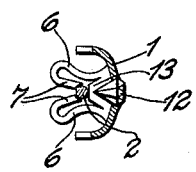
Fig. 5 is a similar sectional view showing still another form of safety catch designed and adapted for use on a jeweled bar pin.

In the variation shown in Fig. 5 the bar 1 has a jewel setting 12 and the base 13 of the catch, which otherwise is the same as that illustrated in Fig. 3, is constructed to span the setting 12 so that it does not interfere with the jewel.

From the foregoing it will be seen that the pin is passed through the cloth and out, and again through the cloth so as to leave an exposed portion of the pin for engagement with the catch as will be readily understood by reference to Fig. 1. When in engagement with the catch the pin is held slightly flexible and under stress so that my invention serves as an adjunct to the present catches constituting a safety catch per se and also holds the pin close to the cloth. The invention obtains all of its intended objects and purposes in a highly efficient and economical manner and the safety catch may be made in various other forms than those shown. I do not restrict myself to the specific forms of the catch shown, but contemplate such variations in the form and design of the catch as may be found desirable or expedient.

What I claim and desire to secure by Letters Patent is:—

1. A bar pin comprising a bar, a pin having one end pivoted near one end of the bar, and a catch for the pin near the opposite end of the bar; in combination with a pair of resilient arms in connection with the bar arranged to engage the pin between said catch and said pivot and hold the intermediate portion of the pin closer to the bar than either of the end portions.

2. A bar pin comprising a bar, a pin having one end pivoted near one end of the bar, and a catch for the pin near the opposite end of the bar; in combination with a pair of resilient arms in connection with the bar arranged to engage the pin between said catch and said pivot and arranged to hold the pin under stress and bent toward the bar and between the pivoted end thereof and said catch.

3. A bar pin comprising a bar, a pin having one end pivoted near one end of the bar, a catch near the opposite end of the bar for releasably engaging the pin, and a device in connection with the bar between the pivoted end of said pin and said catch for holding the intermediate portion of the pin curved closer to the bar than the end portions.

FELIX P. KINTZELE.